US009786244B2

(12) United States Patent
Wu et al.

(10) Patent No.: US 9,786,244 B2
(45) Date of Patent: Oct. 10, 2017

(54) PIXEL DRIVING CIRCUIT AND DRIVING METHOD THEREOF, ARRAY SUBSTRATE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hao Wu, Beijing (CN); Hongjun Yu, Beijing (CN); Xiuqiang Zhao, Beijing (CN); Ziwei Cui, Beijing (CN)

(73) Assignees: BOE TECHNOLOGY GROUP CO., LTD., Beijing (CN); BEIJING BOE OPTOELECTRONICS CO., LTD., Beijing (CN)

( * ) Notice: Subject to any disclaimer, the term of this patent is extended or adjusted under 35 U.S.C. 154(b) by 479 days.

(21) Appl. No.: 14/388,172

(22) PCT Filed: Aug. 16, 2013

(86) PCT No.: PCT/CN2013/081676
§ 371 (c)(1),
(2) Date: Sep. 25, 2014

(87) PCT Pub. No.: WO2014/190623
PCT Pub. Date: Dec. 4, 2014

(65) Prior Publication Data

US 2016/0232870 A1 Aug. 11, 2016

(30) Foreign Application Priority Data

May 29, 2013 (CN) .......................... 2013 1 0205693

(51) Int. Cl.
*G06F 3/038* (2013.01)
*G09G 3/36* (2006.01)

(52) U.S. Cl.
CPC ......... *G09G 3/3688* (2013.01); *G09G 3/3659* (2013.01); *G09G 3/3677* (2013.01);
(Continued)

(58) Field of Classification Search
CPC .... G09G 3/3233; G09G 3/3241; G09G 3/325; G09G 3/3677; G09G 3/3659;
(Continued)

(56) References Cited

U.S. PATENT DOCUMENTS

2003/0151374 A1* 8/2003 Maede ................. G09G 3/3283 315/169.3
2005/0110721 A1 5/2005 Shin et al.
(Continued)

FOREIGN PATENT DOCUMENTS

CN 1620207 A 5/2005
CN 101004885 A 7/2007
(Continued)

OTHER PUBLICATIONS

International Search Report Appln. No. PCT/CN2013/081676; Dated Jan. 24, 2014.
(Continued)

*Primary Examiner* — Michael Pervan
*Assistant Examiner* — Andrew Lee
(74) *Attorney, Agent, or Firm* — Ladas & Parry LLP

(57) ABSTRACT

A pixel driving circuit and driving method thereof, an array substrate and a display device. The pixel driving circuit can maintain a voltage difference between two terminals of a storage capacitor (Cst) when a gate line scanning is ended. The pixel driving circuit comprises a pixel thin film transistor (T0) and a storage capacitor (Cst), wherein a gate of the pixel thin film transistor (T0) is connected to a gate line, a first terminal of the pixel thin film transistor (T0) is connected to a data signal (Data), a second terminal of the
(Continued)

pixel thin film transistor (T0) is connected to a first terminal of the storage capacitor and a second terminal of the storage capacitor (Cst) is grounded. The pixel driving circuit further comprises a follow module connected the first terminal of the storage capacitor (Cst), and configured to maintain a voltage difference between two terminals of the storage capacitor (Cst) when a gate scanning signal (Gate(n)) makes a transition from a high level to a low level, so as to enable the pixel electrode to obtain sufficient voltage thereby ensuring the display effect of the liquid crystal display.

18 Claims, 3 Drawing Sheets

(52) U.S. Cl.
CPC ................. *G09G 2300/043* (2013.01); *G09G 2300/0426* (2013.01); *G09G 2300/0842* (2013.01); *G09G 2310/08* (2013.01); *G09G 2320/0252* (2013.01)

(58) Field of Classification Search
CPC ......... G09G 3/3688; G09G 2320/0252; G09G 2310/08; G09G 2300/0426; G09G 2300/043; G09G 2300/0842
See application file for complete search history.

(56) References Cited

U.S. PATENT DOCUMENTS

| | | | | |
|---|---|---|---|---|
| 2006/0232676 | A1* | 10/2006 | Boemler | H03M 3/324 348/172 |
| 2007/0171177 | A1 | 7/2007 | Kim et al. | |
| 2008/0062341 | A1 | 3/2008 | Tanaka | |
| 2009/0002281 | A1* | 1/2009 | Okamoto | G09G 3/3241 345/76 |
| 2012/0306398 | A1 | 12/2012 | Liang et al. | |

FOREIGN PATENT DOCUMENTS

| | | | |
|---|---|---|---|
| CN | 101140744 | A | 3/2008 |
| CN | 102646388 | A | 8/2012 |
| CN | 102956214 | A | 3/2013 |
| CN | 203259751 | U | 10/2013 |

OTHER PUBLICATIONS

International Preliminary Report on Patentability Appl. No. PCT/CN2013/081676; Dated Dec. 1, 2015.
First Chinese Office Action Appln. No. 201310205693.3; Dated Feb. 27, 2015.

* cited by examiner

PIXEL DRIVING CIRCUIT AND DRIVING METHOD THEREOF, ARRAY SUBSTRATE AND DISPLAY DEVICE

TECHNICAL FIELD

The present disclosure relates to the field of liquid crystal display, in particular to a pixel driving circuit and its driving method, an array substrate and a display device.

BACKGROUND

In a thin film transistor (TFT) liquid crystal display, each of liquid crystal pixel points is driven by a pixel thin film transistor integrated behind the pixel points, and a signal on a data line in a liquid crystal panel is outputted to a pixel electrode through the pixel thin film transistor, so that the pixel electrode and a common electrode work together to make light transmittance of liquid crystal on the pixel electrode changed.

Specifically, the pixel thin film transistor is turned on when a gate scanning signal on a gate line is at a high level, so that the signal on the data line is outputted to a storage capacitor through the pixel thin film transistor, and the storage capacitor influences the pixel electrode. As a result, the pixel electrode has certain voltage and form a capacitor together with the common electrode, so as to control deflection of the liquid crystal in the liquid crystal panel and further control the light transmittance of the liquid crystal panel.

Due to space arrangement and so on, a parasitic capacitor is formed between the gate line and wiring of the storage capacitor. When a gate line scanning is ended, voltage of the gate scanning signal on the gate line is suddenly dropped from 15V to −5V. Due to the effect of the parasitic capacitor, quantity of electricity over the storage capacitor is reduced, thereby failing to provide sufficient voltage to the pixel electrode, which affects a matching effect between the pixel electrode and the common electrode and reduces the display effect of the liquid crystal display.

SUMMARY

The technical problem to be solved in the present disclosure is to provide a pixel driving circuit and its driving method, an array substrate and a display device, which can maintain a voltage difference between two terminals of a storage capacitor when a gate scanning signal is at a low level.

In order to solve the above technical problem, the present disclosure adopts following technical solutions.

There provides in first aspect of the present disclosure a pixel driving circuit comprising a pixel thin film transistor and a storage capacitor, a gate of the pixel thin film transistor being connected to a gate line, a first terminal thereof being connected to a data signal, a second terminal thereof being connected to a first terminal of the storage capacitor, and a second terminal of the storage capacitor being connected to ground. The pixel driving circuit further comprises:

a follow module connected to the first terminal of the storage capacitor for maintaining a voltage difference between two terminals of the storage capacitor when a gate scanning signal makes a transition from a high level to a low level.

The follow module comprises:

- a first switch transistor group including at least one switch transistor, a gate of the switch transistor of the first switch transistor group being connected to a first clock signal, a first terminal thereof being connected to the storage capacitor, and a second terminal thereof being connected to a first terminal of a first resistor;
- a first resistor, whose first terminal is connected to the second terminal of the switch transistor of the first switch transistor group, and second terminal is connected to a first terminal of a switch transistor of a second switch transistor group;
- a second switch transistor group including at least one switch transistor, a gate of the switch transistor of the second switch transistor group being connected to the storage capacitor, a first terminal thereof being connected to the second terminal of the first resistor, and a second terminal thereof being connected to ground;
- a second resistor, whose first terminal is connected to the data signal, and second terminal is connected to a first terminal of a switch transistor of a third switch transistor group;
- a third switch transistor group including at least one switch transistor, a gate of the switch transistor of the third switch transistor group being connected to the storage capacitor, a first terminal thereof being connected to the second terminal of the second resistor, and a second terminal thereof being connected to ground The first switch transistor group, the second switch transistor group and the third switch transistor group comprise two switch transistors;

- gates of the two switch transistors of the first switch transistor group are connected with each other, first terminals thereof are connected, and second terminals thereof are connected;
- gates of the two switch transistors of the second switch transistor group are connected with each other, first terminals thereof are connected, and second terminals thereof are connected with each other;
- gates of the two switch transistors of the third switch transistor group are connected with each other, first terminals thereof are connected, and second terminals thereof are connected.

Optionally, the first clock signal makes a transition from a low level to a high level when the gate scanning signal makes a transition from the high level to the low level.

Optionally, the switch transistor of the second switch transistor group is the same as the switch transistor of the third switch transistor group.

A resistance of the first resistor is the same as a resistance of the second resistor.

A second aspect of the present disclosure provides a driving method of a pixel driving circuit, comprising following steps:

- turning on a pixel thin film transistor, and inputting a data signal into a storage capacitor through the pixel thin film transistor to charge the storage capacitor, when a gate scanning signal makes a transition from a low level to a high level, and at the same time, switching on switch transistors of a second switch transistor group and a third switch transistor group;
- connecting a first terminal of a first resistor to the storage capacitor through the switch transistor of the first switch transistor group when the gate scanning signal makes a transition from the high level to the low level and a first clock signal makes a transition from the low level to the high level. At this time, since the switch transistors of the second switch transistor group and the third switch transistor group have not been switched off yet, the switch transistor of the second switch transistor group, the switch transistor of the third switch transistor group, the first resistor and a second transistor form a mirror current source, so as to maintain a voltage difference between the two terminals of the storage capacitor;

switching off the switch transistor of the first switch transistor group when the first clock signal makes a transition from the high level to the low level.

A third aspect of the present disclosure provides an array substrate comprising the above pixel driving circuit.

A fourth aspect of the present disclosure provides a display device comprising the above array substrate.

In the technical solutions of the embodiments of the present disclosure, the pixel driving circuit comprises a follow module. The follow module maintains the voltage between the two terminals of the storage capacitor when the gate line scanning is ended and the gate scanning signal is at the low level, which guarantees that the pixel electrode can obtain sufficient voltage, ensures the display effect of the liquid crystal display and improves the user experience.

BRIEF DESCRIPTION OF THE DRAWINGS

In order to specify technical solutions in embodiments of the specification or in the prior art more clearly, the accompanying figures needed to be used in the description of the embodiments will be simply introduced below. Obviously, the figures described below are just some embodiments of the present disclosure, and other figures can further be obtained according to these figures without paying any inventive labor for those ordinary skilled in the art.

DETAILED DESCRIPTION

Technical solutions in embodiments of the present disclosure will be clearly and completely described in combination with the figures in the embodiments of the present disclosure. Obviously, the embodiments described below are a part of embodiments rather than all embodiments. Based on the embodiments in the present disclosure, all the other embodiments obtained by those skilled in the art without paying any inventive labor belong to the protection scope of the present disclosure.

Figure 1:
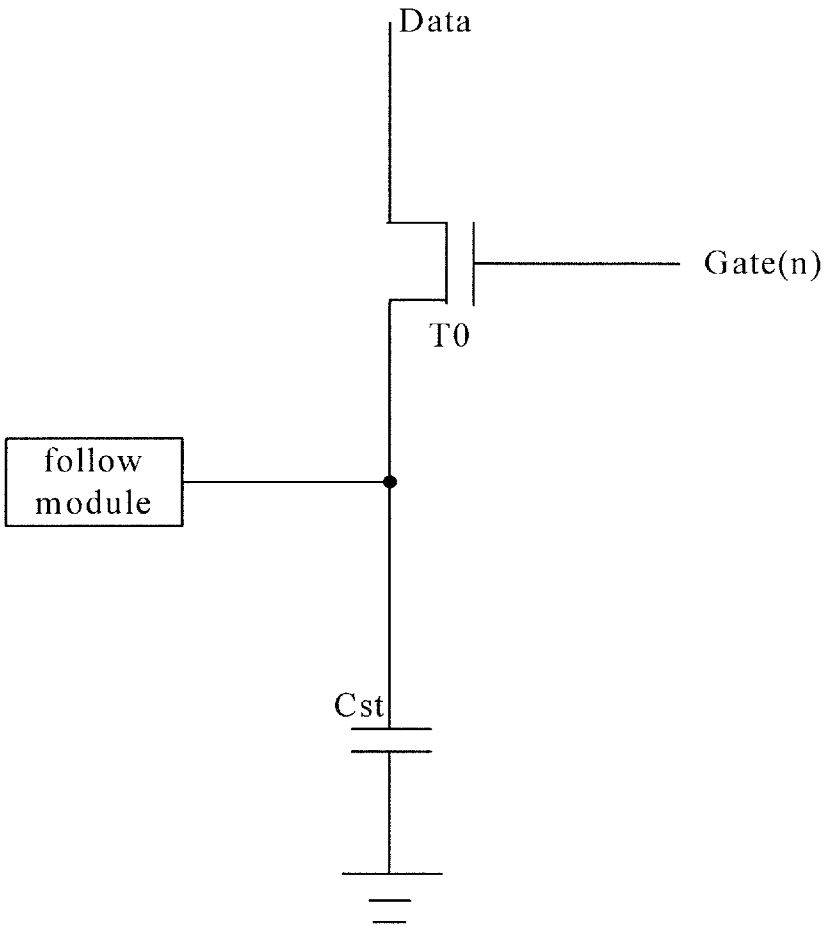
FIG. 1 is a first schematic diagram of a structure of a pixel driving circuit in an embodiment of the present disclosure.

An embodiment of the present disclosure provides a pixel driving circuit. As shown in FIG. 1, the pixel driving circuit comprises a pixel thin film transistor T0 and a storage capacitor Cst. A gate of the pixel thin film transistor T0 is connected to a n-th row of gate line, a first terminal thereof is connected to a data signal Data, and a second terminal thereof is connected to a first terminal of the storage capacitor Cst; a second terminal of the storage capacitor Cst is connected to ground. The pixel driving circuit further comprises:

a follow module connected to the first terminal of the storage capacitor Cst for maintaining a voltage difference between the two terminals of the storage capacitor Cst when a gate scanning signal makes a transition from a high level to a low level.

As shown in FIG. 1, when the n-th row of gate line scanning is ended such that a gate scanning signal Gate(n) makes a transition from the high level to the low level, since an effect of a parasitic capacitor exists between the gate line and the storage capacitor Cst, quantity of electricity on the storage capacitor Cst will be reduced, while the follow module is connected to the storage capacitor Cst, and thus the voltage between the two terminals of the storage capacitor Cst keeps unchanged under the effect of the follow module.

In the technical solution of the present embodiment, the pixel driving circuit comprises a follow module. The follow module maintains the voltage between the two terminals of the storage capacitor when the gate line scanning is ended and the gate scanning signal is at the low level, which guarantees that the pixel electrode can obtain sufficient voltage, ensures the display effect of the liquid crystal display and improves the user experience.

Figure 2:
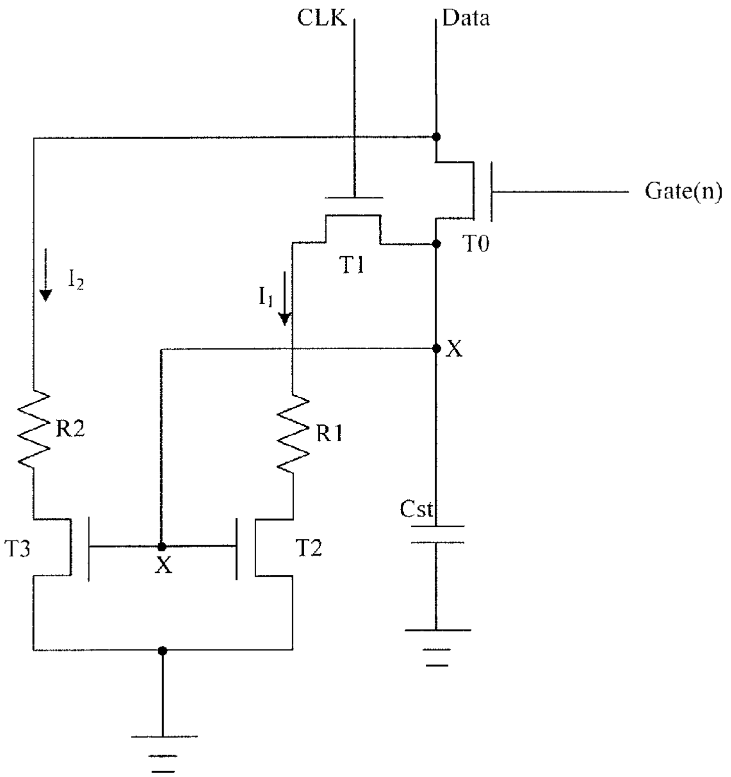
FIG. 2 is a second schematic diagram of a structure of a pixel driving circuit in an embodiment of the present disclosure.

Further, as shown in FIG. 2, the follow module comprises:

a first switch transistor group T1 including at least one switch transistor, a gate of the switch transistor of the first switch transistor group T1 being connected to a first clock signal CLK, a first terminal thereof being connected to the storage capacitor Cst, and a second terminal thereof being connected to a first terminal of a first resistor R1;

a first resistor R1, whose first terminal is connected to the second terminal of the switch transistor of the first switching transistor group T1, and second terminal is connected to a first terminal of a switch transistor of a second switch transistor group T2;

a second switch transistor group T2 including at least one switch transistor, a gate of the switch transistor of the second switch transistor group T2 being connected to the storage capacitor Cst, a first terminal thereof being connected to the second terminal of the first resistor R1, and a second terminal thereof being connected to ground;

a second resistor R2, whose first terminal is connected to a data signal Data, and second terminal is connected to a first terminal of a switch transistor of a third switch transistor group T3;

a third switch transistor group T3 including at least one switch transistor, a gate of the switch transistor of the third switch transistor group T3 being connected to the storage capacitor Cst, a first terminal thereof being connected to the second terminal of the second resistor R2, and a second terminal thereof being connected to ground.

Herein, each of the switch transistor group comprises at least one switch transistor, and gates of respective switch transistors in the same switch transistor group are connected, first terminals thereof are connected, and at the same time, and second terminals thereof are connected. It can be seen that respective switch transistors in each of the switch transistor group perform the same function in the pixel driving circuit. When a switch transistor in a switch transistor group cannot operate due to fault, other switch transistors in the switch transistor group can still operate normally, so as to guarantee the pixel driving circuit to operate normally, which is helpful to increase reliability of the operation of the pixel driving circuit.

Figure 3:
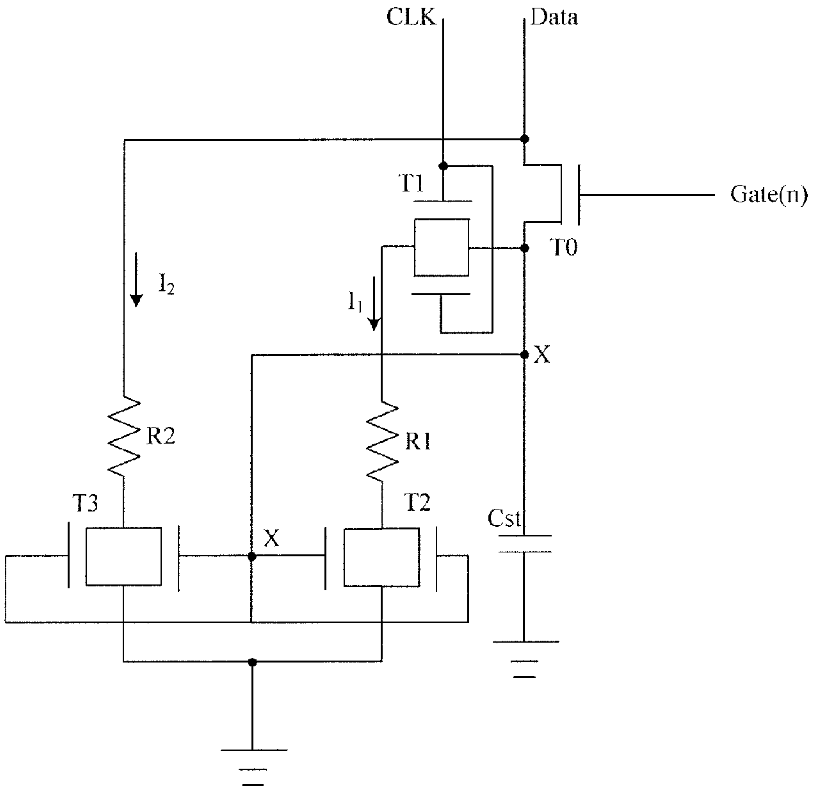
FIG. 3 is a third schematic diagram of a structure of a pixel driving circuit in an embodiment of the present disclosure.

It is needed to specify that, in order to make FIG. 2 clearer and to be more useful to know the structure of the follow module, each of the switch transistor group in FIG. 2 only comprises one switch transistor, and the case that each of the switch transistor group comprises a plurality of switch transistors is similar. For example, FIG. 3 shows a structure that the first switch transistor group T1, the second switch transistor group T2 and the third switch transistor group T3 all comprise two switch transistors. Gates of the two switch transistors of the first switch transistor group Ti are connected, first terminals thereof are connected, and second terminals thereof are connected; gates of the two switch transistors of the second switch transistor group T2 are connected, first terminals thereof are connected, and second terminals thereof are connected; gates of the two switch transistors of the third switch transistor group T3 are connected, first terminals thereof are connected, and second terminals thereof are connected. Such a structure of the follow module in the pixel driving circuit is simpler and has higher operation reliability, which is an exemplary embodiment of the technical solution of the present disclosure.

In the embodiment of the present disclosure, the first terminal of the switch transistor may be a source or a drain. Correspondingly, the second terminal of the switch transistor may be a drain or a source.

Figure 4:
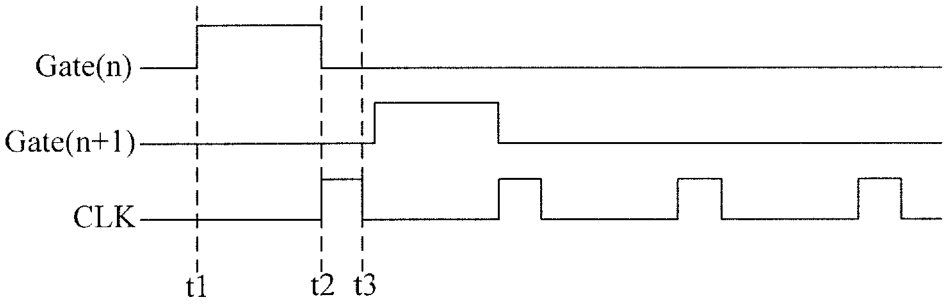
FIG. 4 is a timing diagram of a pixel driving circuit in an embodiment of the present disclosure.

The embodiment of the present disclosure further provides a driving method of the pixel driving circuit as shown in FIG. 2 or FIG. 3, comprising:

at a first time t1, the gate scanning signal Gate(n) makes a transition from the low level to the high level, the pixel thin film transistor T0 is turned on, the data signal Data is inputted to the storage capacitor Cst through the pixel thin film transistor T0 to charge the storage capacitor Cst, and at the same time, the switch transistors of the first switch transistor T2 and the third switch transistor T3 are switched on;

at a second time t2, the gate scanning signal Gate(n) makes a transition from the high level to the low level, the first clock signal CLK makes a transition from the low level to the high level, the first terminal of the first resistor R1 is connected to the storage capacitor Cst through the switch transistor of the first switch transistor group T1, the switch transistors of the second switch transistor group T2 and the third switch transistor group T3 have not been switched off yet, the switch transistor of the second switch transistor group T2, the switch transistor of the third switch group T3, the first resistor R1 and the second resistor R2 form a mirror current source to maintain the voltage difference between the two terminals of the storage capacitor Cst;

at a third time t3, the first clock signal CLK makes a transition from the high level to the low level, and the switch transistor of the first switch transistor group T1 is switched off FIG. 4 is a timing diagram of the pixel driving circuit, and a detailed specification for the driving method of the pixel driving circuit as shown in FIG. 2 or FIG. 3 will be given below in combination with FIG. 4:

at a first time t1, when the high level of the gate scanning signal Gate(n) of the n-th row of gate line comes, that is, the gate scanning signal Gate(n) makes a transition from the low level to the high level, the pixel thin film transistor T0 of the pixel driving circuit, which is integrated behind the pixel points, is turned on, and at this time, the data signal Data is inputted to the storage capacitor Cst through the pixel thin film transistor T0 to charge the storage capacitor Cst. In the meantime, potential at a connecting point X of the gates of the second switch transistor group T2, the gates of the third switch transistor group T3 and the storage capacitor Cst is at the high level, and the switch transistors of the second switch transistor group T2 and the third switch transistor group T3 are switched on;

at a second time t2, i.e., the moment when the n-th row of gate line scanning is ended, the gate scanning signal Gate(n) makes a transition from the high level to the low level, and the first clock signal CLK makes a transition from the low level to the high level, so that the switch transistor of the first switch transistor group T1 whose gate is connected to the first clock signal CLK is switched on, the first terminal of the first resistor R1 is connected to the storage capacitor Cst through the switch transistor of the first switch transistor group T1, the switch transistors of the second switch transistor group T2 and the third switch transistor group T3 have not been switched off, and the switch transistor of the second switch transistor group T2 and the switch transistor of the third switch group T3, the first resistor R1 and the second resistor R2 form a mirror current source to maintain the voltage difference between the two terminals of the storage capacitor Cst.

Specifically, at this time, the third switch transistor group T3 and the second resistor R2 are connected to the date signal Data, i.e., one terminal of the pixel thin film transistor T0; the second switch transistor group T2 and the first resistor R1 are connected to the storage capacitor Cst, i.e., the other terminal of T0. Since the switch transistors of the second switch transistor group T2 and the switch transistors of the third switch transistor group T3 are the same, the manufacturing process and design for the switch transistor of the second switch transistor group T2 and the switch transistor of the third switch transistor group T3 are completely the same; moreover, the resistance of the first resistor R1 and the resistance of the second resistor R2 are small, in generally being from 100Ω to 10 k Ω, and the resistance of the first resistor R1 is the same as the resistance of the second resistor R2. Also, since the distance between the second switch transistor group T2 and the third switch transistor group T3 can be set to be very close when being manufactured specifically, the effect caused by the second switch transistor group T2 and the third switch transistor group T3 being distributed separately from each other can be reduced to a greatest extent. To sum up, it can be made that the second switch transistor group T2, the third switch transistor group T3, the first resistor RI and the second resistor R2 form the mirror current source at this instant, and then a current $I_1$ flowing through the first resistor R1 and the second switch transistor group T2 will be changed with a current $I_2$ flowing through the second resistor R2 and the third switch transistor group T3.

At the moment of the n-th row of gate line scanning being ended, the data signal Data is basically unchanged, and thus $I_2$ remains unchanged. Since the current $I_1$ flowing through the first resistor R1 and the second switch transistor group T2 will be changed with the current $I_2$ flowing through the second resistor R2 and the third switch transistor group T3, the current $I_1$ remains unchanged. As a result, the potential at point X will remain unchanged, that is, the quantity of electricity over the storage capacitor Cst remains unchanged, which guarantees that the pixel electrode can obtain sufficient voltage, ensures the display effect of the liquid crystal display, and enhances the user experience.

Then, at a third time t3, the first clock signal CLK makes a transition from the high level to the low level, the switch transistor of the first switch transistor group T1 is switched off, and the effect of the follow module vanishes. The storage capacitor Cst maintains this potential until the high level of the gate scanning signal Gate(n) of the n-th row of gate line comes again.

It needs to specify that the duration time for the high level of the first clock signal CLK can be set to be comparatively short, or a rising edge of the CLK signal corresponds to a falling edge of the Gate(n) signal and the falling edge of the CLK signal corresponds to the rising edge of the Gate(n+1) signal, but there cannot be superposition, and it shall be ensured that the potential at the point X remains unchanged when the gate line scanning is ended; at the same time, it should also be ensured that there is exactly a first clock signal CLK making a transition from the low level to the high level when each of the gate scanning signals Gate makes a transition from the high level to the low level, and during the time period of the gate scanning signal Gate maintaining at the high level, the first clock signal CLK is always at the low level. That is, as shown in FIG. 3, the first clock signal CLK is always at the low level when the gate scanning signal Gate(n) of the n-th row of gate line is at the high level; there is exactly a first clock signal CLK making a transition from the low level to the high level when the gate scanning signal Gate(n) of the n-th row of gate line makes a transition from the high level to the low level. The (n+1)-th row of gate line is in the same way.

In order to further enhance the operation reliability of the pixel driving circuit, respective switch transistors of the first switch transistor group T1, the second switch transistor group T2 and the third switch transistor group T3 can adopt a design of narrow channel and large width to length ratio. The switch transistors of such design can be switched on when the gate voltage is relatively small, for example, the switch transistors can be made to be switched on when the gate voltage is 2V or 3V.

Further, the embodiment of the present disclosure further provides an array substrate comprising the above pixel driving circuit.

Further, the embodiment of the present disclosure further provides a display device comprising the above array substrate.

The above descriptions are just specific implementations of the present disclosure, but the protection scope of the present disclosure is not limited thereto. Alternations or replacements that can be easily conceived by those skilled in the art who are familiar with the technical field within the technical scope disclosed in the present disclosure can be included within the protection scope of the present disclosure. Therefore, the protection scope of the present disclosure shall be subject to the protection scope of the claims.

What is claimed is:

1. A pixel driving circuit, comprising a pixel thin film transistor and a storage capacitor, a gate of the pixel thin film transistor being connected to a gate line, a first terminal of the pixel thin film being connected to a data signal, a second terminal of the pixel thin film being connected to a first terminal of the storage capacitor, and a second terminal of the storage capacitor being grounded, wherein the pixel driving circuit further comprises:

- a follow module connected to the first terminal of the storage capacitor, and configured to maintain a voltage difference between two terminals of the storage capacitor when a gate scanning signal makes a transition from a high level to a low level wherein the follow module comprises:
- a first switch transistor group including at least one switch transistor, a gate of the switch transistor of the first switch transistor group being connected to a first clock signal, a first terminal of the switch transistor of the first switch transistor group being connected to the first terminal of the storage capacitor;
- a first resistor, whose first terminal is connected to a second terminal of the switch transistor of the first switch transistor group;
- a second switch transistor group including at least one switch transistor, a gate of the switch transistor of the second switch transistor group being connected to the first terminal of the storage capacitor, a first terminal of the switch transistor of the second switch transistor group being connected to the second terminal of the first resistor, and a second terminal of the switch transistor of the second switch transistor group being connected to ground;
- a second resistor, whose first terminal is connected to the data signal;
- a third switch transistor group including at least one switch transistor, a gate of the switch transistor of the third switch transistor group being connected to the first terminal of the storage capacitor, a first terminal of the switch transistor of the third switch transistor group being connected to the second terminal of the second resistor, and a second terminal of the switch transistor of the third switch transistor group being connected to ground.

2. The pixel driving circuit according to claim 1, wherein, the first switch transistor group, the second switch transistor group and the third switch transistor group all comprise two switch transistors;

- gates of the two switch transistors of the first switch transistor group are connected with each other, first terminals of the two switch transistors of the first switch transistor group are connected with each other, and second terminals of the two switch transistors of the first switch transistor group are connected with each other;
- gates of the two switch transistors of the second switch transistor group are connected with each other, first terminals of the two switch transistors of the second switch transistor group are connected with each other, and second terminals of the two switch transistors of the second switch transistor group are connected with each other; and
- gates of the two switch transistors of the third switch transistor group are connected with each other, first terminals of the two switch transistors of the third switch transistor group are connected with each other, and second terminals of the two switch transistors of the third switch transistor group are connected with each other.

3. The pixel driving circuit according to claim 1, wherein the first clock signal makes a transition from a low level to a high level when the gate scanning signal makes a transition from the high level to the low level.

4. The pixel driving circuit according to claim 1, wherein the switch transistor of the second switch transistor group is the same as the switch transistor of the third switch transistor group.

5. The pixel driving circuit according to claim 1, wherein a resistance of the first resistor is the same as a resistance of the second resistor.

6. An array substrate comprising the pixel driving circuit according to claim 1.

7. The array substrate according to claim 2, wherein the first clock signal makes a transition from a low level to a high level when the gate scanning signal makes a transition from the high level to the low level.

8. The array substrate according to claim 2, wherein the switch transistor of the second switch transistor group is the same as the switch transistor of the third switch transistor group.

9. The array substrate according to claim 2, wherein a resistance of the first resistor is the same as a resistance of the second resistor.

10. The array substrate according to claim 6, wherein, the first switch transistor group, the second switch transistor group and the third switch transistor group all comprise two switch transistors;

gates of the two switch transistors of the first switch transistor group are connected with each other, first terminals of the two switch transistors of the first switch transistor group are connected with each other, and second terminals of the two switch transistors of the first switch transistor group are connected with each other;

gates of the two switch transistors of the second switch transistor group are connected with each other, first terminals of the two switch transistors of the second switch transistor group are connected with each other, and second terminals of the two switch transistors of the second switch transistor group are connected with each other; and gates of the two switch transistors of the third switch transistor group are connected with each other, first terminals of the two switch transistors of the third switch transistor group are connected with each other, and second terminals of the two switch transistors of the third switch transistor group are connected with each other.

11. The array substrate according to claim 6, wherein the first clock signal makes a transition from a low level to a high level when the gate scanning signal makes a transition from the high level to the low level.

12. The array substrate according to claim 6, wherein the switch transistor of the second switch transistor group is the same as the switch transistor of the third switch transistor group.

13. The array substrate according to claim 10, wherein a resistance of the first resistor is the same as a resistance of the second resistor.

14. The array substrate according to claim 10, wherein the first clock signal makes a transition from a low level to a high level when the gate scanning signal makes a transition from the high level to the low level.

15. The array substrate according to claim 10, wherein the switch transistor of the second switch transistor group is the same as the switch transistor of the third switch transistor group.

16. The array substrate according to claim 10, wherein a resistance of the first resistor is the same as a resistance of the second resistor.

17. A display device comprising the array substrate according to claim 6.

18. A driving method of a pixel driving circuit, comprising the following steps:

turning on a pixel thin film transistor and inputting a data signal into a storage capacitor through the pixel thin film transistor to charge the storage capacitor, when a gate scanning signal makes a transition from a low level to a high level, and at the same time, switching on switch transistors of a second switch transistor group and a third switch transistor group;

connecting a first terminal of a first resistor to a first terminal of the storage capacitor through the switch transistor of the first switch transistor group when the gate scanning signal makes a transition from the high level to the low level and a first clock signal makes a transition from the low level to the high level, at this time, since the switch transistors of the second switch transistor group and the third switch transistor group have not been switched off yet, the switch transistor of the second switch transistor group, the switch transistor of the third switch transistor group, the first resistor and a second transistor form a mirror current source, so as to maintain the voltage difference between the two terminals of the storage capacitor;

switching off the switch transistor of the first switch transistor group when the first clock signal is transited from the high level to the low level.

* * * * *